T. F. RATAICZAK & H. L. JOHNSTON.
MIXING MACHINE.
APPLICATION FILED MAR. 1, 1915.
1,264,128.
Patented Apr. 23, 1918.
2 SHEETS—SHEET 1.
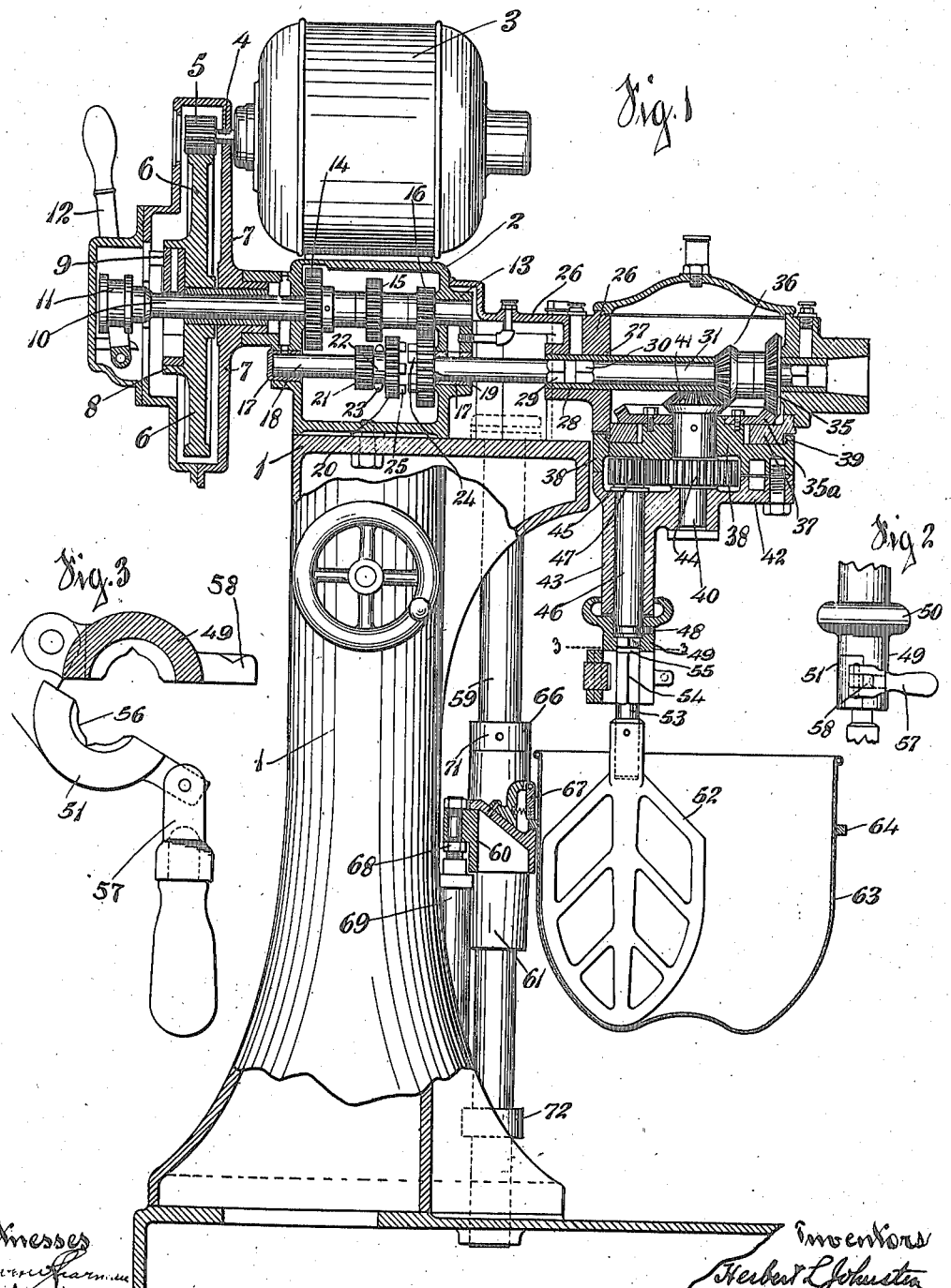

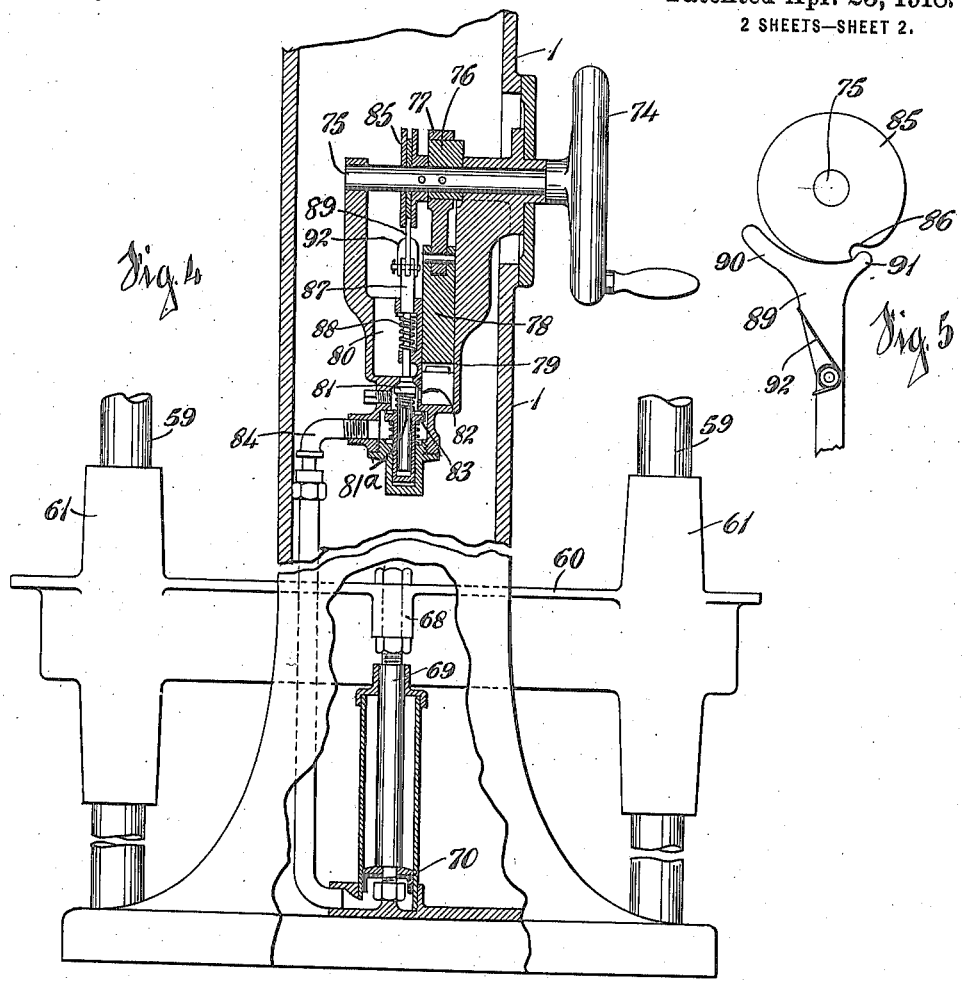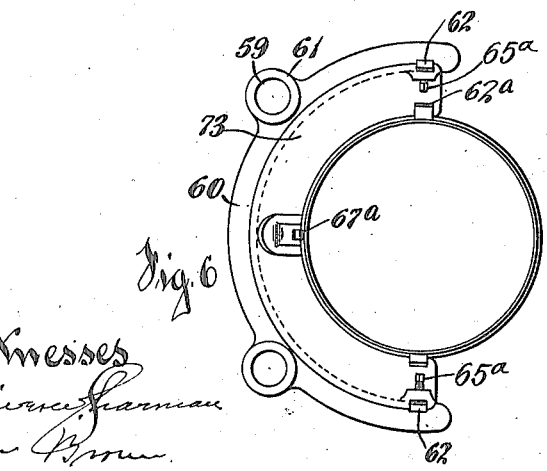

UNITED STATES PATENT OFFICE.

THOMAS F. RATAICZAK AND HERBERT L. JOHNSTON, OF TROY, OHIO, ASSIGNORS TO THE HOBART MANUFACTURING COMPANY, OF TROY, OHIO, A CORPORATION OF OHIO.

MIXING-MACHINE.

1,264,128.        Specification of Letters Patent.      Patented Apr. 23, 1918.

Application filed March 1, 1915. Serial No. 11,314.

*To all whom it may concern:*

Be it known that we, THOMAS F. RATAICZAK and HERBERT L. JOHNSTON, citizens of the United States, and residents of the city of Troy, in the county of Miami and State of Ohio, have invented certain new and useful Improvements in Mixing-Machines, of which the following is a full, clear, and exact description, reference being had to the accompanying drawings, forming part of this specification.

Our invention relates to cake mixing machines of the type used by bakers, wherein power is employed to drive a beater, this power being an electric motor, as shown, or a pulley may be substituted in place of the large gear into which the motor pinion meshes. In machines of this type, it is desirable to provide various features for the convenience of the operator, and it is desired in the structure herein described to provide a standard, a clutch for transmitting power to the driving shaft, change speed gearing, a rotating casing for holding the shaft of a stirring beater, means for imparting rotation to the beater shaft in said casing, a supporting means for a can or bowl for the dough to be mixed, and means for raising and lowering the bowl.

It is the object of this invention to safeguard and simplify the structure of these various features. In the means for holding the can or bowl and the beater, it is our object to maintain the beater at a fixed height, and to insure its proper mounting at such height and to hold the bowl in fixed relation to its support. It is desired to provide for the mounting of bowls of different size, and for the hydraulic raising and lowering of the bowl supports. It is desired to provide a friction clutch and sliding gear shaft for change of speed which admits of a throwing into neutral of the sliding gears.

It is a further object of our invention to provide means for imparting rapid rotation to the beater shaft, simultaneously with slow movement of the rotating beater frame, and in this connection to actuate the beater shaft independent of the frame.

The object is further to provide a bowl holder which will permit of the easy removing of the bowl without the necessity of lowering it.

These objects and various others we accomplish by that certain construction and arrangement of parts to be hereinafter more specifically pointed out and claimed in the ensuing specification and claims based thereon.

In the drawings,

Figure 1 is a central, vertical longitudinal section of the mixer complete.

Fig. 2 is a detail elevation of the paddle holding attachment.

Fig. 3 is a horizontal section of the same taken on the line 3, 3, of Fig. 1.

Fig. 4 is a central, vertical longitudinal section of the hydraulic can support raising means, taken at right angles to Fig. 1.

Fig. 5 is a detail front elevation of the disk and dog for reversing the hydraulic raising means.

Fig. 6 is a top plan view of the can or bowl holder and adapter for accommodating bowls of different sizes.

Fig. 7 is a perspective view of the can or bowl.

1 is the main framework of the machine, upon which is mounted the gear case 2 and above the gear case any desired electric motor 3. The shaft 4 of the motor provided at its end with a pinion 5, drives a large idle gear 6 which is in mesh with the pinion. This gear is mounted in a housing 7 which is secured to the gear case 2 in any desired manner. The large gear 6 has a friction band 8, and within the band is the expanding drum 9 which is keyed to the driving shaft 10 of the machine. The drum expanding sliding sleeve 11 is actuated by the lever 12 to cause the motor to drive the shaft 10.

The shaft 10 extends through the gear casing 2, the end of the shaft being journaled at 13 in the casing, and the said shaft has fixedly mounted on it in said casing the large gear 14, the intermediate gear 15 and the small gear 16. Mounted in bearings 17, 17, in the gear case 2, is a shaft 18, on which are mounted the large loose gear 19 and the sliding intermediate gear 20 and the small gear 21.

The gears 20 and 21 are mounted on a sliding sleeve 22, which is provided with a key to prevent its rotation on the shaft 18, and between the two gears 20 and 21 a groove is formed for the reception of any gear shifting means 23. The large gear 19 always in mesh with the small gear 16 on the driving shaft, has the clutch pins 24. The gear 20 has on its outer face the clutch pins 25 which, when the gear 20 is moved slidably along the shaft 18 to the right, will mesh with the pins 24 on the gear 19, thereby coupling up the gear 19 with the shaft 18 for slow speed. By sliding the gear 20 to the left, until it lies in a position intermediate the pins 24 and the gear 15 on the driving shaft, the driven shaft 18 will not be turned except by such friction as there may be between it and the gear 19. This is the neutral position in the gear transmission. Continuing the movement of the gear 20 to the left, it will slide into mesh with the gear 15, which will give the intermediate speed, and sliding still farther to the left will bring the gear 21 into mesh with the gear 14, providing the high speed.

The housing for the beater actuating devices is mounted on the casing 1 in any desired manner, and formed in this housing is the journal 27 for a sleeve 28 which has squared apertures to receive the squared end 29 of the shaft 18 and the squared end 30 of the shaft 31 which operates the beater actuating devices. Mounted fixedly on the shaft 31, within the housing 26, is the beveled pinion 35 and in front of it the beveled pinion 36. In mesh with the pinion 35 is a large beveled gear 35ª which finds a seat on the shoulder 37 of the housing 26. This gear is fixedly secured to a revolving casing 38, and when the shaft 31 and its pinion 35 are driven, this housing will rotate below the housing 26. The housing 38 takes a running seat on the under side of the shoulder 37 of the housing 26, and is further supported by a projection 39 constituting a bearing passing through the bearing 37.

Journaled in the casing 38 is a vertical shaft 40, which has a pinion 41 at its upper extremity which is in mesh with the pinion 36 on the shaft 31. Suitably bolted to the casing 38 is a plate 42 which has a tubular extension 43 near its periphery. A chamber is formed between this plate 42 and the casing 38, within which is located a gear 44 fixedly mounted on the vertical shaft 40, and supported in this tubular extension by a flange 45 is a vertical shaft 46, which has at its upper extremity a small gear 47 which is in mesh with the gear 44.

It is now evident that when the driven shaft 31 is actuated, the casing 38 will revolve slowly and the shaft 46 in the tubular portion 43 will revolve rapidly. This shaft 46 actuates the beater, and it is to be noted that during the revolution of the tubular portion 43, the shaft 46 will revolve a number of times controlled by the gear train which operates it. Thus the beater will not always return to the same position after one complete revolution, but will traverse a large number of paths, as for example, over two hundred different paths in the arrangement shown in Fig. 1.

Secured by means of set screws 48 to the projecting extremity of the shaft 46 is the socket member 49 for the beater shaft. This socket member has the inwardly turned flange 50 for engaging over the tubular portion 43. The socket member has also a hinged section 51 adapted to open to receive the beater shaft. The beater 52 of any desired design is provided with a shaft 53 having a squared end 54, and at the end of the shaft a circular flanged head 55. The integral portion of the socket member 49 and the hinged portion 51 have squared inner walls cut away at the top to form shoulders 56, 56, which are adapted when the socket member is closed to provide a squared receiving member for the squared portion of the shaft 53, and to engage underneath the head 55. Pivotally mounted on the hinged portion 51 is located any desired latch member 57, to engage over the stud 58 on the integral portion. It will be evident that with this form of securing the beater shafts to the actuating devices, it is readily possible to obtain a uniform position for the beaters by the simple means of making their length from the top of the beater to the circular head on the shaft always uniform.

The devices for retaining and for raising and lowering the mixing bowl will now be described. The machine is provided with a pair of vertical rods 59, 59, and a frame 60 is provided having sleeves 61, 61, slidably mounted on these rods 59. This frame 60 is semi-circular (Fig. 6) and has near its extremities the interior slots 62, 62. The bowl 63 has a flange 64 located at a fixed given height from the base of the bowl, and this flange seats over the frame 60. The bowl also has on each side the square vertical lugs 65, which slide into the slots 62 in the frame and are engaged by gibs 65ª which are located in the slots 62 and which can be adjusted out and in for the proper centering of the bowl so that the beater in its rotation shall not strike the sides of the bowl.

It is very important to prevent the bowl from tipping in its semi-circular frame and accordingly a bracket 66 is provided on the frame from which is suspended a spring-pressed tongue 67 which will snap over the top of the bowl flange 64, thereby preventing movement in either direction of this flange, and removing all chances of tipping. This method of mounting the bowl is very advantageous in that the bowl can be removed without lowering the frame which supports the bowl which quite evidently would be the case were the said frame made in the form of a complete circle. In removing the bowl, the beater is first removed from its socket and lifted out, the tongue 67 disengaged and the bowl lifted sufficiently to be disengaged from the slots 62 in the frame. The bowl can then be removed from the frame without disturbing its horizontal position.

Secured at 68 to the frame 60 is the piston 69 of an hydraulic ram 70. By operation of the ram as will be described the frame 60 may be raised and lowered on the rods or standards 59, the upward movement of the frame being stopped by the collar 71 and the downward movement stopped by the collar 72 on these standards. The proportions of bowl, beater and frame and the location of the stop 71 are arranged so that when the frame is at the top of its upward movement such beater as is being employed will just clear in its movement the bottom of the bowl that is in use. In order to accommodate bowls of smaller diameter than the diameter of the frame 60, a segmental plate or adjuster 73 is provided, which seats on the frame in the same manner as a large sized bowl would do, and in its turn is provided with slots 62$^a$ and spring-pressed tongue or latch 67$^a$ (Fig. 6).

For operating the hydraulic ram, a hand wheel 74, controlling a shaft 75, journaled in the casing 1 of the machine, is provided. Mounted on this shaft 75 is a cam 76 over which rides an eccentric strap 77 to which is connected a plunger 78. This plunger 78 reciprocates in a chamber 79 formed in a casting supported in the main casing 1, and formed also in this casting is a reservoir 80 for containing the fluid that is to operate the ram, preferably glycerin. A valve 81 is located in the base of the reservoir, and when the piston 78 is raised, it will draw glycerin from the reservoir 80 down through the opening 82 controlled by the valve 81 and into the cylinder 79. On the downstroke of the piston 78 the valve 81 will be closed by a proper spring 81$^a$ and the valve 83 unseated, allowing the glycerin to pass down the pipe 84 to the ram 70 above mentioned. In order to control the ram for both upward and downward movement, the disk 85 is mounted on the shaft 75, this disk being provided with a notch 86.

Reciprocatingly secured in the reservoir 80 is a plunger 87, which when moved downwardly will strike the valve 81 and unseat it. A spring 88 maintains this plunger out of contact with the valve 81. Mounted on the upper end of this plunger 87 is a tripping dog 89. This dog has a cam end 90 which is in contact with the periphery of the disk 85. In the position shown in Fig. 5, when the hand wheel 74 is turned in clockwise direction, the notch 86 on the disk will engage the lug 91 of the cam surface 90, and the dog will be thrown to the left, thereby raising the plunger 87 well out of the way of the valve 81, since the dog will ride away from the periphery of the disk 85, allowing the spring 88 to push it upwardly. The continued rotation of the shaft 75 for working the ram will, therefore, not affect the dog as it will be clear of the periphery of the disk, and the rotation of the disk will continue to hold it there as long as the rotation is clockwise.

When it is desired to lower the piston of the ram, the hand wheel 74 is turned in the opposite direction and the lug 91 which is maintained against the periphery of the disk by means of the spring 92, will be thrown to the right by the movement of the disk, thereby causing the cam 90 to ride on the disk and the plunger to be depressed until it unseats the valve 81. Further movement of the hand wheel 74 will cause a further depression of the plunger 87 by the notch 86 engaging the end of the cam portion 90 of the dog, and the valve 81 will be moved downwardly so as to unseat the valve 83 which lies directly beneath it. These two valves now being open, the fluid which has been supporting the piston of the ram will flow back into the reservoir 80, thereby allowing the bowl holding frame to gradually settle down. If during this downward motion it is not deemed desirable to cause the bowl supporting frame to stop, a turn of the hand wheel in counter clockwise direction will allow the valves 81 and 83 to resume their seats, thereby stopping the return flow of glycerin.

It is evident that by controlling the proportion of the parts in this hydraulic raising device, a delicacy of adjustment of the bowl with regard to the stirring beaters can be obtained, which is far superior to the ordinary mechanical devices of the art. For example, parts may be arranged so that for each revolution of the hand wheel 74, the bowl holding frame will be raised but one quarter of an inch.

Referring back to the various structures of this mixer for the purpose of pointing out the advantages thereof, it is desired to note the following particulars: In the first place, this mechanism has a friction clutch that will counteract any damage resulting from accidental stoppage beyond the point of application of the driving power. In the next place, it is to be noted that the gear shift is of the sliding type and not of the clash gear type, and that high intermediate and low speeds, as well as neutral, can be accomplished by means of it. It is of decided advantage to use the power plant of the mechanism for grinding or other operations, and as described an attachment is provided whereby the various grinding tools may be secured to the machine. The advantages of the bowl and beater attaching means have been dealt with, these having as their purpose the preventing of damage by the beater striking against the bowl and throwing the bowl off of its seat, or otherwise destroying the machine. It has also been remarked that the planetary actuation of the mixing or stirring beater will provide for a large number of paths to be made by the beater within the bowl, and that it was not necessary to lower the bowl to remove it from beneath the beater actuating devices.

By reference to specific mechanical expedients in the description above, it is not desired to limit the scope of the claims that follow to any one particular expedient where the claim calls broadly for a means in general.

Having thus described our invention, what we claim as new and desire to secure by Letters Patent, is:—

1. In a machine of the character described provided with a mixing bowl, the combination with a rotatable shaft socket member, a beater shaft adapted to fit nonrotatably therein, means in said socket and on said shaft for holding the shaft against falling therefrom, said means being releasable to permit removal of the shaft laterally from the socket member without lowering the mixing bowl, and a vertically adjustable support for the mixing bowl, with means for removing the bowl laterally without lowering the support.

2. In a machine of the character described, the combination with a vertically adjustable supporting member, a semi-circular frame mounted on said supporting member, and a vessel for containing the material to be beaten, said vessel being of a size to slide laterally onto the frame without adjusting the frame, said frame having means thereon to prevent the vessel from tipping thereon.

3. In a machine of the character described provided with a mixing bowl, the combination with a revolving shaft for beater operation, a socket member thereon, a beater shaft, and means on the shaft and in the socket member for holding the shaft against falling therefrom, said socket member being openable laterally so as to release the beater shaft therefrom without pulling it downwardly out of the socket member, whereby the beater may be removed without lowering the bowl, and a vertically adjustable support for the mixing bowl, with means for removing the bowl laterally without lowering the support.

4. In a machine of the character described provided with a mixing bowl, the combination with a revoluble shaft, a mixing bowl fixed in predetermined vertical relation thereto, a socket member on the shaft, a beater having a shaft, said shaft and socket being squared, and a flange on the beater shaft, and a shoulder in the socket member, for positioning the beater shaft in fixed relation to the mixing bowl, said socket member being openable laterally so as to release the beater shaft therefrom without pulling it downwardly out of the socket member.

5. In a machine of the character described, the combination with a revoluble shaft, a mixing bowl in predetermined vertical relation thereto, a socket member on the shaft, a beater having a shaft, said shaft and socket being squared, and a flange on the beater shaft, and a shoulder in the socket member, for positioning the beater shaft in fixed relation to the mixing bowl, said socket member being split longitudinally and releasable upon said split to allow the removal of the beater shaft laterally without dropping it out of the socket member, whereby the beater may be removed without lowering the bowl.

6. In a machine of the character described, the combination with a bowl, means for supporting the bowl comprising a semicircular frame, said bowl being of a size to slide into said frame laterally without any adjustment thereof, and a catch to hold the bowl from tipping thereon.

7. In a machine of the character described, the combination with a bowl, a beater having a shaft, a revoluble socket member to receive said shaft, means on the shaft and the socket member for holding said shaft against falling therefrom, said socket member having a hinged portion adapted to open, to allow lateral insertion and removal of the shaft.

THOMAS F. RATAICZAK.
HERBERT L. JOHNSTON.

Witnesses:
CHARLES C. WILLARD,
W. H. HARTLEY.